United States Patent [19]
Barnes et al.

[11] 3,880,013
[45] Apr. 29, 1975

[54] ADAPTOR FOR MOUNTING OPERATING POWER DRIVE UNITS ON VALVES

[76] Inventors: Virgil O. Barnes, P.O. Box 14; George E. Johnson, P.O. Box 353, both of Missouri City, Tex. 77459

[22] Filed: Feb. 13, 1974

[21] Appl. No.: 442,236

[52] U.S. Cl............................ 74/89.15; 74/424.8 VA
[51] Int. Cl............................................ F16h 27/02
[58] Field of Search........ 251/264; 74/625, 424.8 R, 74/424.8 VA, 89.15

[56] References Cited
UNITED STATES PATENTS

| | | | |
|---|---|---|---|
| 1,017,619 | 2/1912 | Caldan | 74/424.8 A |
| 1,890,254 | 12/1932 | Martin, Jr. | 251/264 |
| 2,571,552 | 10/1951 | Elderkin et al. | 74/424.8 R |
| 2,878,687 | 3/1959 | Kron et al. | 74/625 |
| 2,996,075 | 8/1961 | Deimer et al. | 251/264 |

*Primary Examiner*—Wesley S. Ratliff, Jr.
*Attorney, Agent, or Firm*—John A. Hamilton

[57] ABSTRACT

An adaptor for mounting an operating power drive unit on a valve having a stem driven by a stem nut carried rotatably by the valve yoke, consisting of a base plate normal to the stem and adapted to be seated on the outer end surface of the yoke, encircling the stem nut, a C-shaped retainer plate adapted to bridge the stem within the yoke and to retain the stem nut in assembly with the yoke, a pair of torque bars insertable through the yoke at respectively opposite sides of the stem, and abutting the retainer plate, the bolts parallel to the stem and securing the torque bars to the base plate, and strut bolts extending transversely to the stem and operable to press the torque bars outwardly against the yoke legs, the power drive unit being mountable on the base plate.

8 Claims, 5 Drawing Figures

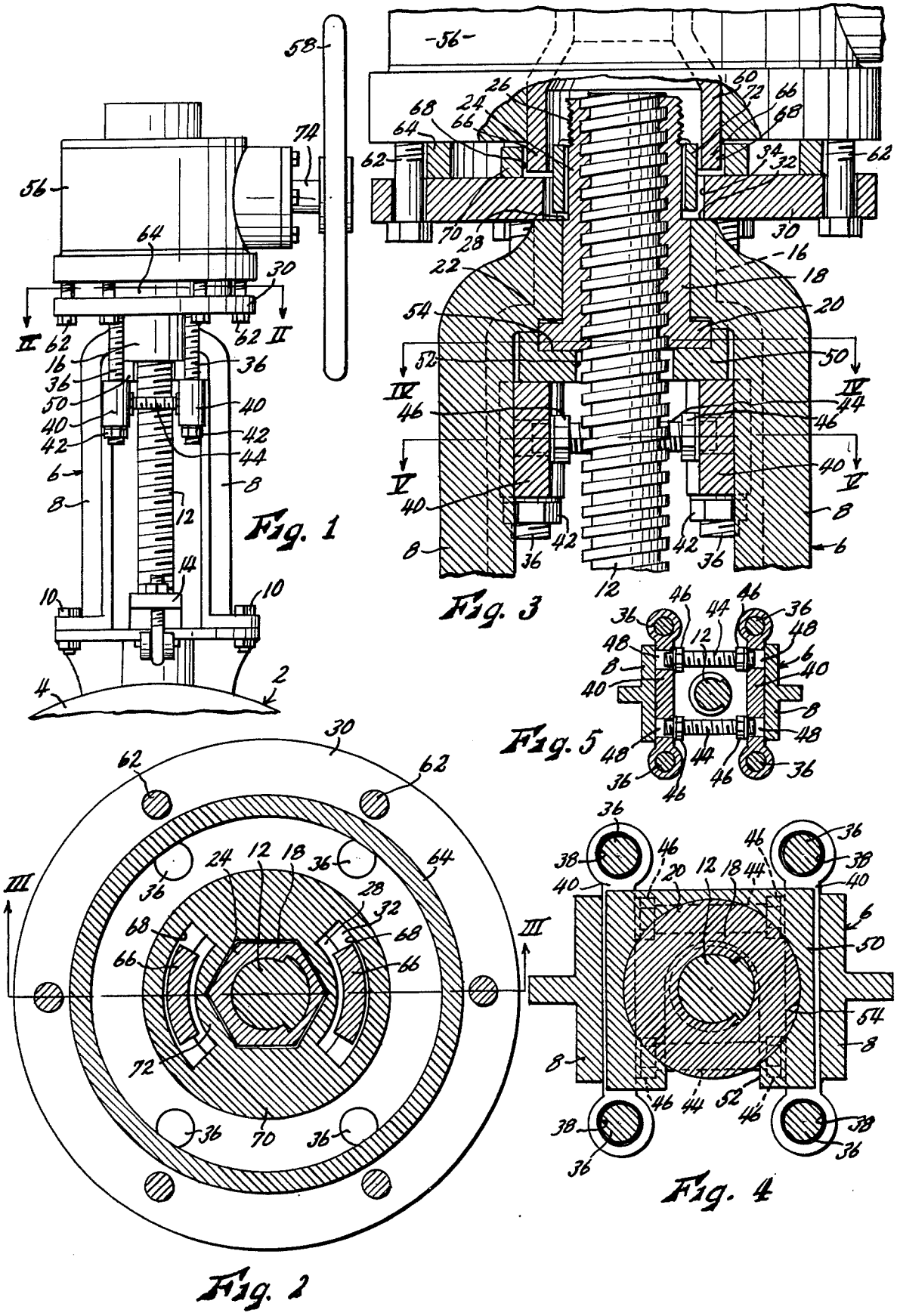

3,880,013

ADAPTOR FOR MOUNTING OPERATING POWER DRIVE UNITS ON VALVES

This invention relates to new and useful improvements in accessory equipment for valves, and has particular reference to an adaptor for mounting a power drive unit, such as a geared drive unit, on a valve not previously so equipped, but operated only by the usual handwheel. The installation of such adaptors, particularly in certain environments with which we are particularly concerned, such as in oil and gas pipelines and refineries, is accompanied by certain problems. The adaptor must obviously be very securely mounted if the power drive is to function efficiently. It is usually desired to be able to adapt the valve for power operation without removing it from service, so that any adaptor the mounting of which requires dismantling or machining of the valve itself cannot be used. The valve to be adapted for power control is often disposed in a position to which access is difficult so that installation of the adaptor must be simple, and adjustably adaptable to variations in the often rough-cast valve parts. The valve is often disposed in a hazardous atmosphere, i.e. explosive, so that no welding can be permitted, despite the rigidity of mounting required.

Accordingly, the object of this invention is the provision of an adaptor for mounting a power drive unit on a valve which is extremely rigid and vibration-proof, the mounting of which does not require removal of the valve from service, nor require any machining or alteration of the valve structure, which requires no welding, but can be installed with no tools other than simple wrenches, which is adjustable to compensate for minor variations in valve dimensions, and which may be dismantled from one valve and moved to another.

These objects are accomplished by the provision of an adaptor consisting of a base plate adapted to overlie the outer end of the valve yoke encircling the valve stem nut, a retainer plate having a C-shaped aperture adapted to bridge the stem within the yoke to retain the stem nut in assembly with the yoke, a pair of torque bars insertable through the yoke at respectively opposite sides of the stem and bearing against the face of the retainer plate distal from said base plate, and bolt means for securing said base plate and torque bars rigidly against separation parallel to the stem axis, and for pressing said torque bars tightly outwardly against the yoke, whereby the base plate is rigidly mounted. The power drive unit may then be mounted on the base plate, and provided with a driving connection to the stem nut.

Other objects are simplicity and economy of construction, and efficiency and dependability of operation.

With these objects in view, as well as other objects which will appear in the course of the specification, reference will be had to the accompanying drawing, wherein:

FIG. 1 is a fragmentary side elevational view of a rising stem gate valve, showing a power operating unit mounted thereon by means of an adaptor embodying the present invention, FIG. 2 is an enlarged sectional view taken on line II—II of FIG. 1, FIG. 3 is a fragmentary sectional view taken on line III—III of FIG. 2, with parts left in elevation, FIG. 4 is a sectional view taken on line IV—IV of FIG. 3, and FIG. 5 is a reduced sectional view taken on line V—V of FIG. 3.

Like reference numerals apply to similar parts throughout the several views, and the numeral 2 applies generally to a gate valve, shown only fragmentarily. The valve includes a body, not shown, in which there is a valve seat, operable to be opened and closed by the raising or lowering of a valve gate, also not shown. A valve bonnet 4, which contains the valve gate when the valve is open, is affixed to the top of the valve body, and a valve yoke 6, of generally inverted U-shape, and having generally parallel side legs 8, is affixed to the top of the bonnet as by bolt 10. A threaded valve stem 12 is connected non-rotatably at its lower end to the valve gate, and extends upwardly through bonnet 4, through a packing gland 14 at the top of the bonnet, through yoke 6 between and parallel to the legs 8 thereof, and through a concentric cylindrical bushing 16 formed by the yoke at the outer end thereof.

Within bushing 16, stem 12 is threadably engaged by a stem nut 18 which is freely rotatable in bushing 16, and which is provided at its inner end with an external peripheral flange 20 which usually is engaged in a socket 22 formed therefor in the inner end of bushing 16 by enlarging the lower end portion of the bore of said bushing. Outwardly of bushing 16, stem nut 18 is formed externally to present a hexagonal lug 24, and has an externally threaded portion 26 at its extreme outer end. In the usual manually operated valve, the stem nut is turned, whereby to raise or lower stem 12 to respectively open or close the valve, by a handwheel having a hub with a hexagonally apertured hub engageable non-rotatably over lug 24 of the nut, and secured thereon by a lock nut threaded on portion 26 of the stem nut. If lug portion 24 of the stem nut is cylindrical, the handwheel hub is keyed non-rotatably thereon. In either case, the handwheel hub seats against an external shoulder 28 of the stem nut, said shoulder being spaced from flange 20 of the nut by a distance slightly greater than the axial length of bushing 16, in order to prevent any possibility of binding of the parts. Thus, outward thrust of the nut is resisted by its flange 20, and inward thrust is resisted by the handwheel itself.

To prepare the valve for installation of the adaptor forming the subject matter of the present invention, it is necessary only to remove the handwheel and its lock nut, which is a simple operation involving only the use of an ordinary wrench, and which can be performed without any other dismantling of the valve, and without removing the valve from service, providing only that the valve is closed at the time.

The elements of the adaptor forming the subject matter of the present invention include a base plate 30 which is planar and disposed normally to the valve stem. It is adapted to rest against the planar outer end surface 32 of yoke bushing 16, and has a central circular aperture 34 which then encircles lug portion 24 of the stem nut, but is of larger diameter than said lug. Affixed in said base plate are four continuously threaded tie bolts 36. Said tie bolts extend toward the valve bonnet, parallel to the valve stem and externally of yoke bushing 16, symmetrically to the stem axis. At their extended end portions, the two tie bolts at each of the respectively opposite sides of stem 12 extend freely through holes 38 provided therefor at the opposite ends of a torque bar 40 disposed normally thereto and transverse to the stem, the two torque bars extending through yoke 6 at respectively opposite sides of stem 12. A nut 42 provided with a lock washer is threaded on each tie bolt beneath the associated torque bar. A pair of strut bolts 44 extend between the torque bars, normally thereto and respectively at opposite sides of the valve stem. A pair of nuts 46, each provided with a lock washer, are threaded on each strut bolt, and are adapted to be moved apart on said bolts to move the torque bars forcibly apart. The extreme end portions of the strut bolts are engaged loosely in holes 48 formed therefor in the torque bars.

Disposed between torque bars 40 and bushing 16 of the yoke is a retainer plate 50. Said retainer plate is rectangular and normal to the valve stem, being of such a width as to be insertable between the yoke legs 8, with opposite edge portions thereof resting on the two torque bars, and having a C-shaped aperture 52 adapted to bridge the valve stem, and opening through an edge of the plate. The surface of this retainer plate confronting flange 20 of the stem nut has a socket 54 formed therein corresponding to socket 22 of the yoke, and adapted to receive stem nut flange 20 rotatably therein. The combined depths of sockets 22 and 54 is slightly greater than the axial thickness of flange 20, so that the stem nut may rotate freely when the retainer plate is drawn tightly against the yoke bushing, as will appear.

The power drive unit 56 selected for illustration is a gear unit driven by a handwheel 58 and having gearing operable to multiply force applied to said handwheel to drive an output spindle 60 thereof, although it will be apparent that motor-driven power units could be utilized if desired. The power drive unit is affixed to base plate 30 by screws 62 arranged in a ring concentric with the valve stem, and being spaced apart from the base plate by a spacer ring 64 of slightly smaller diameter than the ring of screws. The output spindle 60 is then coaxial with the valve stem, and depends into the space between the drive unit and the base plate, encircling the extended portion of the stem nut. The spindle is hollow, and is provided at its depending end with a pair of angularly opposite lugs 66. These lugs engage in corresponding segmental slots 68 formed therefor in a circular drive plate 70 which is concentric with the stem nut and somewhat thinner than spacer ring 64 so as to rotate freely. The drive plate is provided with a central hub 72 which depends into central aperture 54 of the base plate, and which is internally hexagonal to engage freely but non-rotatably over stem nut lug 24. As with the handwheel, the drive plate may be provided with a cylindrical central opening and keyed to hub 24, if said hub is cylindrical. The angular extent of spindle lugs 66 is less than that of slots 68 of the drive plate, to permit a degree of lost motion therebetween, so that when the spindle is turned, it can deliver a "hammer" blow to the drive plate, in order to break the valve gate free if it is wedged tightly closed, or if it is wedged tightly in its backseated open position.

Application of the adaptor is quite simple. Retainer plate 50 is first inserted into the yoke, with its slotted aperture 52 bridging the valve stem 12 and its socket 54 engaging stem nut flange 20, and is manually held in place while base plate 30 is applied to top end surface 32 of yoke bushing 16 with its central aperture 34 encircling lug 24 of the stem nut. Tie bolts 36 may be previously fixed in the base plate. Torque bars 40 are then applied over the free end portions of the tie bolts as shown, and nuts 42 started on said tie bolts. Strut bolts 44 are then inserted as shown, and their nuts 46 threaded outwardly thereon to engage the torque bars. The strut bolts may be inserted after the torque bars are in place provided that their length is such that they extend no more than half of the thickness of the torque bars through holes 48 of said torque bars. Nuts 42 and 46 are then tightened evenly and very tightly. Tightening of nuts 42 tensions tie bolts 36 to hold the base plate firmly against surface 32 of the yoke bushing, and to press retainer plate 50 very tightly against the inner end surface of yoke bushing 16. Stem nut flange 20 is then rotatably enclosed in sockets 22 and 54, being prevented from moving upwardly by bushing 16, as was the case with the handwheel, and prevented from moving downwardly by the retainer plate, a function previously performed by the handwheel. The tightening of nuts 46 causes bolts 44 to act as rigid struts between torque bars 40, forcing said torque bars rigidly outwardly against side legs 8 of the valve yoke. This rigid engagement of the torque bars with the yoke, acting through the tie bolts 36, braces base plate 30 rigidly against rotation about the valve stem axis, forces tending to produce such rotation being applied to the base plate by a counterrotative reaction to the torque applied to the stem nut by power unit 56, which is of course mounted on the base plate. The base plate is thus mounted on the valve yoke with great firmness and rigidity.

Drive plate 70 may then be dropped into place as shown, spacer ring 64 rested on the base plate, and power unit 56 rested on the spacer ring with the lugs 66 of its spindle engaging in segmental slots 68 of the drive plate, and the power unit 56 secured in place by screws 62. Said screws form a ring keeping the spacer ring properly centered. As indicated in FIG. 3 spindle 60 is hollow to permit rising of stem 12 therethrough as the stem nut is turned to open the valve. In some cases, the handwheel which was originally removed from the stem nut may simply be transferred to the input shaft 74 of the power drive unit. The valve is then fully adapted for operation by the power drive unit 56.

The adaptor thus described is considered to possess numerous advantages. It can be installed with no machine work on or other adaptation of the valve itself. The yoke is not disturbed, and the adaptor can be installed without removing the valve from service, so long as the valve is closed. Its installation requires no tools other than ordinary wrenches, and can therefore be performed readily in positions to which access may be difficult, and requires no welding, so that it can be performed in explosive or otherwise hazardous atmospheres. It is readily adjustable to fit valves the yoke dimensions of which may be somewhat variable. The mounting of the base plate, which serves as the mounting platform for the power drive unit, is extremely and permanently rigid, so as to be reliably vibration-proof. Also, if desired, the adaptor may be dismantled and transferred from valve to valve.

While we have shown and described a specific embodiment of our invention, it will nevertheless be readily apparent that many minor changes of structure and operation could be made without departing from the spirit of the invention.

What we claim as new and desire to protect by Letters Patent is:

1. An adaptor for mounting a power drive unit having a power output spindle on a valve having a U-shaped yoke, a threaded valve stem extending through said yoke parallel to its sides legs and through a bushing formed by said yoke at the closed end thereof, and a stem nut threaded on said stem and rotatably engaged in said bushing, said stem nut projecting outwardly from said bushing to form a lug which may be engaged to turn said nut, said adaptor comprising:
   a. a base plate having a central aperture, said base plate being adapted to be positioned with its plane normal to the valve stem against the outer end of said yoke bushing with its aperture encircling said stem nut lug,
   b. a pair of torque bars insertable through said yoke transversely to said stem and respectively at opposite sides thereof,
   c. two pairs of tie bolts fixed in said base plate normally thereto so as to extend toward said torque bars externally of said yoke bushing, the extended ends of each pair of tie bolts extending through the respectively opposite ends of one of said torque bars,
   d. a nut threaded on each of said tie bolts at the side of the associated torque bar distal from said base plate,
   e. means for attaching said power drive unit to said base plate with the output spindle of the former disposed coaxially with the central aperture of said base plate, and
   f. connecting means operable to connect said output spindle to said stem nut lug, whereby rotation of the former turns the latter.

2. An adaptor as recited in claim 1 with the addition of:
   a. a pair of strut bolts extending normally to said torque bars so as to be disposed at respectively opposite sides of said valve stem, and engaging loosely in holes formed therefor in said torque bars, and
   b. a pair of nuts threaded on each of said strut bolts intermediate said torque bars, whereby said torque bars may be moved away from each other into tight engagement with the respective legs of said valve yoke, whereby to secure said base plate against rotation about the axis of said valve stem.

3. An adaptor as recited in claim 1 for use in connection with a valve the stem nut of which is provided at its inner end with a peripheral flange bearing outwardly against the inner end of said yoke bushing, and with the addition of a retainer plate parallel to said base plate and insertable into said bushing, said retainer plate having a C-shaped aperture opening through an edge thereof and adapted to bridge said valve stem, said retainer plate having one surface thereof abutting the inner end of said yoke bushing and its opposite surface supported at opposite edge portions thereof by said torque bars, the surface thereof abutting said yoke bushing having a socket formed therein for receiving said stem nut flange rotatably therein.

4. An adaptor as recited in claim 3 with the addition of:
   a. a pair of strut bolts extending normally to said torque bars so as to be disposed at respectively opposite sides of said valve stem, and engaging loosely in holes formed therefor in said torque bars, and
   b. a pair of nuts threaded on each of said strut bolts intermediate said torque bars, whereby said torque bars may be moved away from each other into tight engagement with the respective legs of said valve yoke, whereby to secure said base plate against rotation about the axis of said valve stem.

5. An adaptor as recited in claim 1 wherein said connecting means is operable to permit a limited degree of rotary lost motion between said power drive unit spindle and said stem nut, whereby said power drive unit may deliver rotary hammer blows to said stem nut.

6. An adaptor as recited in claim 1 wherein said power drive unit spindle includes one or more axially projecting segmental lugs, and wherein said connecting means comprises a drive plate having a central hub engageable non-rotatably on said stem nut lug, and having segmental slots formed therein, corresponding in number to said spindle lugs and each adapted to receive one of said lugs therein.

7. An adaptor as recited in claim 6 wherein the angular extent of each of said drive spindle lugs is less than the angular extent of its associated drive plate slot.

8. An adaptor as recited in claim 7 with the addition of an open spacer ring disposable between said base plate and said power drive unit to form an open space therebetween, the lugs of said power drive unit spindle projecting into said open space, and said drive plate being contained in said open space within said spacer ring and being thinner than said spacer ring, so as to be freely rotatable in said space.

* * * * *